J. D. KINSLEY.
CONDIMENT SHAKER.
APPLICATION FILED JULY 31, 1909.
964,433.
Patented July 12, 1910.
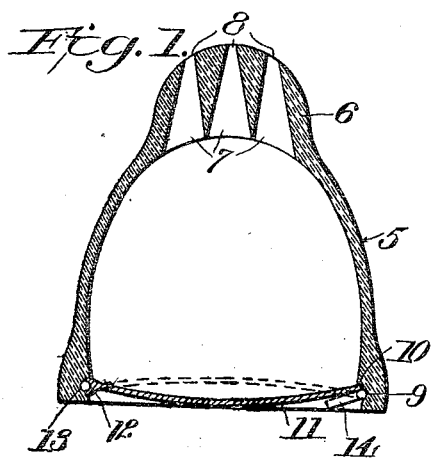
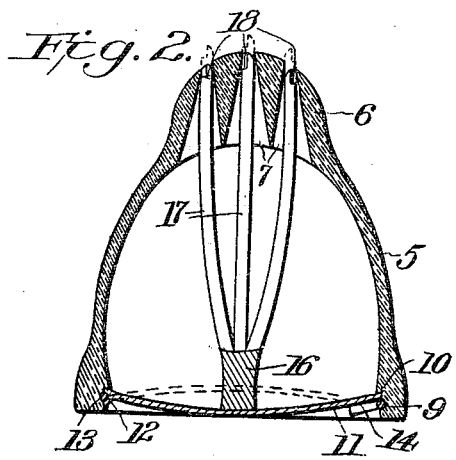
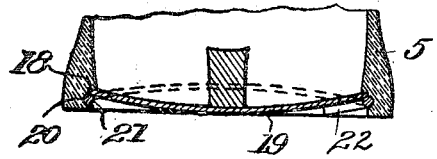
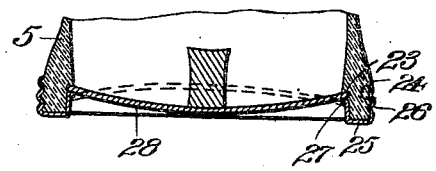
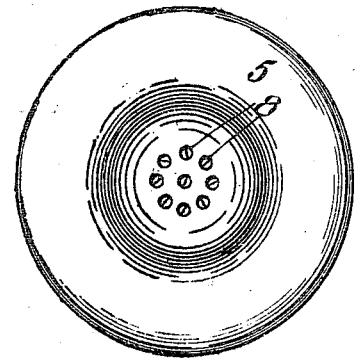
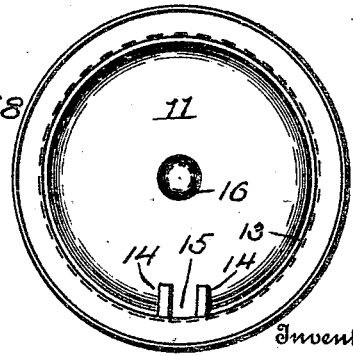
Inventor:
Jason D. Kinsley,
By Bennett H. Hone
Attorney
Witnesses

UNITED STATES PATENT OFFICE.

JASON D. KINSLEY, OF LISBON, IOWA.

CONDIMENT-SHAKER.

964,433.

Specification of Letters Patent.   Patented July 12, 1910.

Application filed July 31, 1909.   Serial No. 510,594.

*To all whom it may concern:*

Be it known that I, JASON D. KINSLEY, a citizen of the United States, residing at Lisbon, in the county of Linn and State of Iowa, have invented certain new and useful Improvements in Condiment-Shakers, of which the following is a specification.

This invention relates to condiment shakers and has special reference to a condiment shaker of the self-clearing type.

One object of the invention is to provide a shaker with a removable spring bottom.

A second object of the invention is to provide a shaker of the class described with clearing prongs adapted for actuation by the spring bottom.

With the above and other objects in view the invention consists in general of a shaker having a removable spring bottom and being provided with clearing prongs operated by the bottom.

The invention further consists in certain novel details of construction and combinations of parts hereinafter fully described, illustrated in the accompanying drawings and specifically set forth in the claims.

In the accompanying drawings, like characters of reference indicate like parts in the several views, and: Figure 1 is a vertical section through a shaker constructed in accordance with this invention, the disk being shown secured by a snap spring and without stem attached. Fig. 2 is a section of a similar shaker having a stem provided with clearing prongs attached to the disk. Fig. 3 is a partial section through the bottom showing a modified form of retaining spring for the disk. Fig. 4 is another partial section showing a screw washer to hold the disk in place. Fig. 5 is a top plan view of the shaker. Fig. 6 is a detail view of the holding means shown in Fig. 1. Fig. 7 is a detail view of one of the prongs. Fig. 8 is a bottom plan view of the article.

The improved condiment shaker comprises an inverted cup-shaped body 5, which may be manufactured, preferably in a single piece of glass, china, metal or any other suitable material, said body being tapered in an upward direction to present a solid crown or cap 6, which is provided with a plurality of conical and tapering apertures 7; said apertures being tapered or reduced in an upward or outward direction, so that they will terminate in openings 8 of relatively small diameter at the upper or outer extremity of the cap or crown 6. The cup-shaped body 5 is provided near its lower end with an interior annular groove 9, above and adjacent to which there is preferably formed an annular shoulder or offset 10 which may be regarded as constituting the upper side wall of the groove or recess 9.

The inverted cup-shaped body 5 is provided with a closure consisting of a resilient disk or plate 11, preferably constructed of spring metal, celluloid or other suitable material, said disk being by preference normally dished in a downward direction, as will be clearly seen by reference to Fig. 2 of the drawings, very much like the bottom of a conventional oil-can which by pressure exteriorly applied may be sprung or flexed in an upward direction, as indicated in dotted lines in Fig. 2, from which position it will automatically be restored to its normal shape and condition when the pressure is discontinued by the inherent resiliency of the material of which it is constructed. The bottom disk or closure 11 is provided with a marginal groove or recess 12 affording a seat or housing for a retaining member which consists of a curved, approximately circular spring 13, having inturned terminal ends constituting handles 14 that project inwardly in the direction of the center of the bottom 11. The bead of the bottom 11 is provided with a cutaway portion 15 to accommodate the handles 14 of the spring 13. It will be readily seen that by properly manipulating the handles 14, the spring 13 may be compressed within the groove or housing 12, thus reducing its diameter, and enabling the bottom disk 11 to be inserted into the open lower end of the body 5, until it is arrested by contact with the shoulder 10 when by releasing the handle 14, the spring will be permitted to expand into the annular groove 9, thus retaining the bottom disk or closure securely in position until it shall be desired to refill the shaker when the closure may be easily and quickly removed by the reversal of the operation just described. It will be understood that the annular shoulder 10 may be dispensed with, if desired, although it is preferred to retain said shoulder inasmuch as it is considered that the efficiency of the device is increased thereby.

In the form shown in Fig. 2 the disk is provided with certain clearing fingers now to be described. Suitably connected with or secured centrally upon the bottom disk or closure 11, is an upwardly extending stem 16, having a plurality of divergent fingers or prongs 17, which extend into the conical apertures 7, through which said prongs may normally slightly project, as will be seen in Figs. 1 and 2. The prongs 17 are provided near their outer extremities with shoulders or offsets 18, which are normally disposed within the apertures 7, and which serve to forcibly expel or project the condiment, when desired, and to keep the apertures 7 open and unobstructed to the passage of the contents of the device.

In the form shown in Fig. 3 the body is provided with an interior shoulder 18' and the disk consists of a dished spring plate 19 of uniform thickness throughout, the plate being of such size as to enter the bottom of the body and rest against the shoulder 18'. Just beneath the shoulder 18' the body is provided with an internal annular groove 20 arranged for the reception of a strip of spring metal 21 which projects over the plate and is provided with inwardly directed finger grips 22 for the purpose of enabling the spring to be compressed and withdrawn from the groove to permit the plate to fall out.

In the form shown in Fig. 4 the body is provided, as in the last mentioned form, with an internal shoulder 23 but the annular groove is omitted and the body is formed with an external screw thread 24. On this threaded portion is screwed a cap comprising a ring 25 having an external annular threaded flange 26 formed to engage the thread 24 and an internal annular flange 27 arranged to bear against a dished spring plate 28 identical with the plate 19.

The operation and advantages of this invention will be readily understood from the foregoing description when taken in connection with the accompanying drawings. For the purpose of filling and cleaning the device the bottom member or closure may be readily detached and restored. When the contents is to be used, the shaker is inverted and agitated in the usual manner which will usually result in a sufficient quantity of the condiment being sifted out through the apertures 7. Should the contents prove to be lumpy or caked, and therefore refuse to sift out through the apertures, a moderate pressure of the thumb or fingers applied externally to the bottom closure will flex the latter in an inward direction thus causing a snapping action which will break up any caked material in the shaker while, if the prongs be used, the same will clear the holes in the top of any accumulation of material which may have become lodged therein.

The improved device may be advantageously used for sifting and distributing sugar, pepper, salt and other condiments; it may be readily manufactured at a moderate expense; it presents a neat and attractive appearance; and it is free from projections and complicated devices of any kind which will be apt to gather dust and impurities.

Having thus described the invention, what is claimed is:—

1. In a condiment shaker, an inverted cup-shaped body having tapering apertures and a closure for said body consisting of a resilient dished disk provided with a stem having divergent prongs extending into the tapering apertures of the body.

2. In a condiment shaker, an inverted cup-shaped body having a cap or crown provided with tapering apertures and a closure for said body consisting of a resilient dished disk having a stem provided with divergent prongs extending into the tapering apertures and having shoulders or offsets near their outer extremities.

3. In a condiment shaker, an inverted cup-shaped body, having a cap or crown provided with tapering apertures and provided near its lower end with an interior annular groove, and a closure consisting of a disk having a marginal groove, and a retaining spring seated in said groove and expansible into the annular groove of the body.

4. In a condiment shaker, an inverted cup-shaped body having a crown provided with tapered apertures, said body being provided with an open bottom having an annular interior shoulder, a closure for said bottom comprising a resilient dished disk resting on said shoulder, an upward extending stem on said disk provided with prongs projecting into the tapered apertures, and means removably held to the body to retain said disk on said shoulder.

5. An inverted cup-shaped body having a crown provided with tapering apertures, said body being provided near its lower edge with an interior annular groove, and a shoulder or off-set adjacent thereto, in combination with a closure consisting of a resilient dished disk having a marginal groove and an upward extending stem provided with divergent prongs projecting into the tapering apertures and provided with shoulders or offsets near their outer extremities; and a retaining spring seated in the annular groove in the bottom of the disk or closure and expansible into the annular groove of the body.

In testimony whereof I affix my signature in presence of two witnesses.

JASON D. KINSLEY.

Witnesses:
TILLIE ZALESKY,
C. R. RUNKLE.